United States Patent [19]

Ouchi et al.

[11] Patent Number: 4,578,294

[45] Date of Patent: Mar. 25, 1986

[54] HEAT-RESISTANT LAMINATES

[75] Inventors: Isao Ouchi; Hideo Yusa, both of Iwaki, Japan

[73] Assignee: Kureha Kagaku Kogyo Kabushiki Kaisha, Tokyo, Japan

[21] Appl. No.: 578,680

[22] Filed: Feb. 9, 1984

[30] Foreign Application Priority Data

Feb. 25, 1983 [JP] Japan .................................. 58-30570
May 27, 1983 [JP] Japan .................................. 58-93863

[51] Int. Cl.$^4$ .............................................. B32B 1/02
[52] U.S. Cl. .................................. 428/35; 428/476.3; 428/516; 428/518; 428/520
[58] Field of Search ............... 428/516, 518, 520, 522, 428/35, 476.3, 216, 214; 206/524.2; 264/514; 156/244.11

[56] References Cited

U.S. PATENT DOCUMENTS

| | | |
|---|---|---|
| 3,887,755 | 6/1975 | Zamer . |
| 3,900,616 | 8/1975 | Moore . |
| 3,903,351 | 9/1975 | Ando et al. . |
| 4,161,562 | 7/1979 | Yoshikawa et al. ................ 428/518 |
| 4,261,473 | 4/1981 | Yamad et al. ....................... 428/518 |
| 4,284,672 | 8/1981 | Stillman ............................... 428/349 |
| 4,284,674 | 8/1981 | Sheptak ............................... 428/516 |
| 4,296,156 | 10/1981 | Lustig et al. . |
| 4,310,578 | 1/1982 | Katsura et al. .................... 428/516 |
| 4,379,117 | 4/1983 | Baird, Jr. et al. . |
| 4,390,587 | 6/1983 | Yoshimura et al. ............... 428/518 |
| 4,442,158 | 4/1984 | Distler ................................ 428/516 |
| 4,448,792 | 5/1984 | Schirmer . |

Primary Examiner—Edith Buffalow
Attorney, Agent, or Firm—Oblon, Fisher, Spivak, McClelland & Maier

[57] ABSTRACT

Disclosed herein are a heat-resistant laminate comprising a first layer, as one of the outer layers thereof, made of a polymer of propylene or a polyamide; a seventh layer, as the other outer layer thereof, made of a polyolefin or a polyamide; a fourth layer, as a gas-barrier layer, made of a polymer of vinylidene chloride; a second layer and a sixth layer, as adhesive layers (A), made of a modified polyolefin or a mixture of not less than 90% by weight of the modified polyolefin and not more than 10% by weight of a copolymer of ethylene and an acrylic ester or a modified copolymer of ethylene and an acrylic ester and respectively directly jointed to the first layer and the seventh layer; a third layer and a fifth layer, as adhesive layers (B), made of a mixture of 10 to 30% by weight of a modified polyolefin and 90 to 70% by weight of a copolymer of ethylene and an acrylic ester or a modified copolymer of ethylene and an acrylic ester and respectively disposed between the second layer and the fourth layer, and between the fourth layer and the sixth layer and respectively directly jointed to the gas-barrier layer and the adhesive layers (A), and a process for preparing the same.

40 Claims, No Drawings

HEAT-RESISTANT LAMINATES

BACKGROUND OF THE INVENTION

The present invention relates to a heat-resistant laminate which is able to have oil-resistance at a high temperature or, particularly to durability in a high temperature retort and is excellent in barrier property. In detail, the present invention relates to a heat-resistant laminate film or sheet comprising two adhesive layers of a heat-resistant adhesive resin disposed between a layer of a polyamide or a polymer of propylene and a layer of a polymer of vinylidene chloride and also between a layer of a polyamide or a polyolefin and the layer of a polymer of vinylidene chloride. More in detail, the present invention relates to a heat-resistant laminate film or sheet comprising a first layer, as one of the outer layers thereof, made of a polymer of propylene or a polyamide; a seventh layer, as the other outer layer thereof, made of a polyolefin or a polyamide; a fourth layer, as a gas-barrier layer, made of a polymer of vinylidene chloride; a second layer and a sixth layer, as adhesive layers (A), made of a modified polyolefin or a mixture of not less than 90% by weight of the modified polyolefin and not more than 10% by weight of a copolymer of ethylene and an acrylic ester or a modified copolymer of ethylene and an acrylic ester and respectively directly jointed to the first layer and the seventh layer; and a third layer and a fifth layer as adhesive layer (B), made of a mixture of 10 to 30% by weight of a modified polyolefin and 90 to 70% by weight of a copolymer of ethylene and an acrylic ester or a modified copolymer of ethylene and an acrylic ester and respectively disposed between the second layer and the fourth layer, and between the fourth layer and the sixth layer and respectively directly jointed to the gas-barrier layer and the adhesive layers (A), and also relates to a process for preparing the heat-resistant laminate film or sheet comprising the steps of providing a polymer of propylene or a polyamide as one of the outer layers thereof; a polyolefin or a polyamide as the other outer layer thereof; a polymer of vinylidene chloride as a gas-barrier layer; a modified polyolefin or a mixture of not less than 90% by weight of the modified polyolefin and not more than 10% by weight of a copolymer of ethylene and an acrylic ester or a modified copolymer of ethylene and an acrylic ester as an adhesive layer(A); and a mixture of 10 to 30% by weight of a modified polyolefin and 90 to 70% by weight of a copolymer of ethylene and an acrylic ester or a modified copolymer of ethylene and an acrylic ester as an adhesive layer (B) in a plasticized condition within a die extruding these resins in the configuration wherein one of the outer layers thereof (first layer) is the polymer of propylene or the polyamide; the other outer layer (seventh layer) is polyolefin or polyamide; a center layer thereof (fourth layer) is polymer of vinylidene chloride as the barrier layer; the adhesive layers (A) (second layer and sixth layer) are a modified polyolefin or a mixture of not less than 90% by weight of the modified polyolefin and not more than 10% by weight of a copolymer of ethylene and an acrylic ester or a modified copolymer of ethylene and an acrylic ester and one of the two adhesive layers (A) (second layer) is directly jointed to one of the outer layers (first layer) and the other adhesive layer(A) (sixth layer) is directly jointed to the other outer layer (seventh layer); the adhesive layers (B) (third layer and fifth layer) are a mixture of 10 to 30% by weight of a modified polyolefin and 90 to 70% by weight of a copolymer of ethylene and an acrylic ester or a modified copolymer of ethylene and an acrylic ester and one of the two adhesive layers(B) (third layer) is disposed between the center layer (fourth layer) and one of the adhesive layers(A) (second layer) and the other adhesive layer(B) (fifth layer) is disposed between the center layer (fourth layer) and the other adhesive layer(A) (sixth layer), and cooling the thus extruded laminate.

Recently, gas-barriering laminate which can be boil-treated or retort-treated have been used in the field of food-packaging, and that laminate provided with more than one layer made of polyamide from the viewpoint of heat-resistance, oil-resistance and strength and also not less than one layer made of a polymer of vinylidene chloride from the viewpoint of gas-barriering have been proposed as the gas-barriering laminate which can be boil-treated or retort-treated (refer to Japanese Patent Publication No. 57-15546 (1982).

However, in the conventional laminate film, the adhesion between the layer of polyamide and the layer of polymer of vinylidene chloride is not sufficient, and particularly, in the case of using such a laminate film in the field where boil-treatment or retort-treatment is carried out, it is necessary to use a layer of an adhesive agent which can maintain a favorable adhesive strength at a high temperature between the layer of polyamide and the layer of polymer of vinylidene chloride.

The Japanese Patent Publication No. 57-15546 (1982) discloses that the two adhesive layers, one of which is made of an adhesive, modified polyolefin and another of which is made of a copolymer of ethylene and vinyl acetate or an acrylic ester, disposed between the layer of polyamide and the layer of polymer of vinylidene chloride shows good adhesive effects. However, under the extremely severe conditions of pressurized hot water-treatment in a retort carried out, for instance at 120° C. for more than 30 min or at 130° C. for more than 10 min, the adhesion is not necessarily sufficient, and accordingly a gas-barrier heat-resistant laminate having layers more excellently adhered together has been demanded.

As a result of the present inventors' studies, it has been found that the disposition of the two kinds of specified adhesive layers between the heat-resistant outer layer of the polymer of propylene, polyolefin or polyamide and the center layer of polymer of vinylidene chloride gives a heat-resistant laminate which can maintain a sufficient and practical inter-layer adhesion (interlaminar strength) even under the severe conditions in the oil-treatment at a high temperature or the pressurized hot water-treatment and exhibits as excellent heat-resistance and gas-barriering property, and based on the inventors' finding, the present invention has been attained.

SUMMARY OF THE INVENTION

In the first aspect of the present invention, there is provided a heat-resistant laminate comprising a first layer of a polymer of propylene or a polyamide; a seventh layer of a polyolefin or a polyamide; a fourth layer of a polymer of vinylidene chloride; a second layer and a sixth layer of a modified polyolefin or a mixture of not less than 90% of the modified polyolefin and not more than 10% by weight of a copolymer of ethylene and an acrylic ester or a modified copolymer of ethylene and an acrylic ester, the second layer and the sixth layer being respectively directly jointed to the first layer and the seventh layer; a third layer and a fifth layer of a mixture of 10 to 30% by weight of a modified polyolefin and 90 to 70% by weight of a copolymer of ethylene and an acrylic ester or a modified copolymer of ethylene and an acrylic ester, the third layer and the fifth layer being respectively disposed between the second layer and the fourth layer, and between the fourth layer and the sixth layer and respectively directly jointed to the gas-barrier layer and the adhesive layers(A).

In the second aspect of the present invention, there is provided a process for preparing the heat-resistant laminate, comprising the steps of:

providing a polymer of propylene or a polyamide as a first layer; a polyolefin or a polyamide as a seventh layer; a polymer of vinylidene chloride as a fourth layer; a modified polyolefin or a mixture of not less than 90% by weight of a modified polyolefin and not more than 10% by weight of a copolymer of ethylene and an acrylic ester or a modified copolymer of ethylene and an acrylic ester as second and sixth layers and a mixture of 10 to 30% by weight of a modified polyolefin and 90 to 70% by weight of a copolymer of ethylene and an acrylic ester or a modified copolymer of ethylene and an acrylic ester as third and fifth layers in a plasticized condition within a die, co-extruding these resins in the configuration wherein the first layer is one of the outer layers; seventh layer is the other outer layer; the fourth layer is the gas-barrier layer; the second and sixth layers are respectively directly jointed to the respective first and seventh layers and the third and fifth layers are respectively disposed between the fourth layer and the second layer and between the fourth layer and the sixth layer, and cooling the thus co-extruded material, thereby obtaining said heat-resistant laminate

DETAILED DESCRIPTION OF THE INVENTION

A polymer of vinylidene chloride as the gas-barrier layer (fourth layer) in the heat-resistant laminate according to the present invention is a copolymer of 65 to 95% by weight of vinylidene chloride and 35 to 5% by weight of more than one of unsaturated comonomers copolymerizable with vinylidene chloride. As the co-monomer copolymerizable with vinylidene chloride, vinyl chloride, acrylonitrile, acrylic acid and esters of acrylic acid are preferably used. In addition, a generally known additive, for instance, dibutyl sebacate and epoxidized soybean oil, may be admixed with the polymer of vinylidene chloride.

As the polyamide for forming one of the outer layers (first layer), nylon 6, nylon 66, nylon 6-66, nylon 610, nylon 12, nylon 6-66-610 or nylon 6-66-610-12 are used, and as the polymer of propylene for the same purpose, homopolymer of propylene or a copolymer of ethylene and propylene containing not less than 90% by weight of propylene units is used. The polymer of propylene having a crystal melting point of 135° to 165° C. is preferable.

For forming the other outer layer (seventh layer), the above-mentioned polyamide or a polyolefin is used. As the polyolefin, polypropylene, copolymer of ethylene and propylene containing not less than 90% by weight of propylene units, high density polyethylene, medium density polyethylene, linear low density polyethylene(-hereinafter referred to as LLDPE), a mixture of the above-mentioned polymers and a mixture of not less than 50% by weight of at least one of the above-mentioned polymers with at least one of the other polyolefins, for instance, low density polyethylene, copolymer of ethylene and vinyl acetate or ethyl acrylate, is used. The polyolefins having the crystal melting point of not less than 118° C. are preferable.

The role of the outer layers is to give heat-resistance, oil-resistance and mechanical strength to the laminate and accordingly, although polyamide may be used for preparing the two outer layers, particularly, in the case where the heat-sealability and seal strength at high temperature of the laminate is regarded as important, the polyolefin is used for the outer layer which is contacted to the packaged foodstuff.

The characteristic of the present invention is the disposition of the two mutually-different and specified layers between the layer of polymer of vinylidene chloride (the gasbarrier layer) and the layer of polyamide or polymer of propylene and between the layer of polymer of vinylidene chloride (the gasbarrier layer) and the layer of polyamide or polyolefin in order to increase the interlayer adhesion (interlaminar strength) of the layer of polymer of vinylidene chloride to the layer of polyamide, the layer of polymer of propylene and the layer of polyolefin. Because, the adhesion between the layer of polymer of vinylidene chloride and the outer layer of polyamide, polymer of propylene or the polyolefin is originally poor, and the laminate disposed only one adhesive layer of an already known adhesive agent between such layers cannot give a sufficient heat-resistant interlayer adhesion (interlaminar strength) under the severe conditions.

According to the present invention, between the layer of polyamide, polymer of propylene or polyolefin and the layer of polymer of vinylidene chloride, one adhesive layer(A) and the other adhesive layer(B) are provided, the adhesive layer being strongly adhesive to the layer of polyamide, polymer of propylene or polyolefin, the adhesive layer(B) being strongly adhesive to the layer of polymer of vinylidene chloride, the adhesive layer(A) and the other adhesive layer(B) being strongly adhered mutually and the two resins for the respective adhesive layers being heat-resistant, thereby it has been possible to obtain an excellent heat-resistant laminate. In this case, as the adhesive layer(A), a modified polyolefin or a mixture of not less than 90% by weight of the modified polyolefin and not more than 10% by weight of a copolymer of ethylene and an acrylic ester or a modified copolymer of ethylene and an acrylic ester are used. As the modified polyolefin, an acid-modified resin prepared by modifying polyolefin with an unsaturated carboxylic acid such as acrylic acid, metacrylic acid, maleic acid and maleic anhydride in a reaction, for instance, graft polymerization, or a metal salt of the thus acid-modified polyolefin is used. As the polyolefin, polypropylene is preferable, and the content of the unsaturated carboxylic acid in the acid-modified polyolefin is preferably not more than 10% by weight. As the commercialized, acid-modified polyolefin, ADMER(made by MITSUI Petrochemical Co., Ltd.) and MODIK (made by MITSUBISHI Petrochemical Co., Ltd.) have been known.

The content of the acrylic ester in the copolymer of ethylene and an acrylic ester, which is used as the starting material for the modified copolymer of ethylene and an acrylic ester is preferably 5 to 25% by weight, and as the acrylic ester, a $C_1$–$C_8$-alkyl acrylate is preferably used. The modified copolymer of ethylene and $C_1$–$C_8$- alkyl acrylate is prepared by modifying the copolymer with an unsaturated carboxylic acid such as acrylic acid, methacrylic acid, maleic acid and maleic anhydride, and a metal salt of the thus acid-modified copolymer is also used. The content of the unsaturated carboxylic acid in the acid-modified copolymer is preferably not more than 10% by weight, and such an acid-modified copolymer of ethylene and an acrylic ester is superior to the copolymer of ethylene and the acrylic ester in heat-resistance. As a commercialized product of such an acid-modified copolymer of ethylene and an acrylic ester, N-POLYMER(made by Nippon Petrochemicals Co., Ltd.) has been known.

As a resin for use in the adhesive layer(B), a mixture of (1) 10 to 30% by weight of a modified polyolefin which is relatively favorable in adhesion to the layer of polymer of vinylidene chloride and (2) 90 to 70% by weight of a copolymer of ethylene and an acrylic ester or a modified copolymer of ethylene and an acrylic ester which is extremely adhesive to the layer of copolymer of vinylidene chloride is used In the case where the percentage of the modified polyolefin is too large, the adhesion thereof to the layer of polymer of vinylidene chloride is reduced, and on the other hand, in the case where the percentage thereof is too small, the heat-resistance of the mixture is reduced together with the reduction of the adhesion thereof to the adhesive layer(A).

Each of the copolymer and the modified copolymer of ethylene and an acrylic ester which can be used for the adhesive layer(A) may be the same as or different from each of the copolymer and modified copolymer of ethylene and an acrylic ester which can be used for the adhesive layer(B), however, because of the more favorable heat-resistance and adhesion of the modified copolymer of ethylene and an acrylic ester, it is more favorably used.

In the present invention, the above-mehtioned layers are laminated in the following order. The outer layer(first layer)/the adhesive layer(A)(second layer)/the adhesive layer(B) (third layer)/the barrier layer(fourth layer)/the adhesive layer (B)(fifth layer)/the adhesive layer(A)(sixth layer)/the outer layer(seventh layer). By laminating the layers as shown above, since at least one of the outer layers is formed of polyamide or polymer of propylene of high durability and rich in mechanical strength, a laminate of excellent in heat-resistance and mechanical properties can be obtained. In addition, because of (1) the undetachable adhesion between the adhesive layers(A) and the outer layers(first layer and seventh layer), (2) the strong adhesion between the barrier layer(fourth layer) and the adhesive layer(B) and (3) the favorable adhesion between the two adhesive layers(A and B), a laminate of firm interlayer adhesion (interlaminar strength) is obtained. Furthermore, since the adhesive layer(A) jointing to the outer layer is formed of a heat-resistant, modified polyolefin or a mixture containing a large amount of the modified polyolefin, the adhesive layer(A) is rich in heat-resistance, and the adhesive layer(B) is also relatively rich in heat-resistant, because it also contains the modified polyolefin. Accordingly, the laminate according to the present invention does not suffer from any delamination even when treated with oil at a high temperature or treated under a high pressure in a retort at a high temperature.

On the other hand, in the case where only one adhesive layer(A) or (B) is disposed between the outer layer(first layer) and the barrier layer(fourth layer) and further, only one adhesive layer(A) or (B) is provided between the barrier layer (fourth layer) and the other outer layer(seventh layer), the thus obtained interlayer adhesion (interlaminar strength) is not sufficient for preventing the delamination under the severe conditions as in the present invention even by changing the ratio of the modified polyolefin to the copolymer or the acid-modified copolymer in the mixture for the adhesive layer(A) and/or the adhesive layer(B).

The total thickness of the laminate according to the present invention is preferably 40 to 1000 micrometers. The sum of the thickness of the first layer and the seventh layer is 25.2 to 950 micrometers (63 to 95% of the total thickness of the laminate) and the thickness of the first layer is not less than 10 micrometers. The sum of the thickness of the second layer and the sixth layer is 0.2 to 60 micrometers (0.5 to 6% of the total thickness of the laminate) and the thickness of the second layer is not less than 0.1 micrometers. The sum of the thickness of the third layer and the fifth layer is 0.2 to 60 micrometers (0.5 to 6% of the total thickness of the laminate) and the thickness of the third layer is not less than 0.1 micrometers. The thickness of the fourth layer is 1.6 to 250 micrometers (4 to 25% of the total thickness of the laminate). The thickness of the first layer may be the same as or different from that of the seventh layer, the thickness of the second layer may be the same as or different from that of the sixth layer and the thickness of the third layer may be the same as or different from that of the fifth layer. Furthermore, the composition of the resin in the second layer may be the same as or different from that in the sixth layer, and also the composition of the resin in the third layer may be the same as or different from that in the fifth layer, however, from the viewpoint of industrial preparation of the laminate, it is preferable to use the same resin composition in the same thickness, respectively in the set of the second and sixth layers and in the set of the third layer and fifth layer.

The laminate according to the present invention can be prepared by the generally and known process.

Namely, each resin of the number of resins for preparing the same number of layers is melted under the thermoplastic conditions and supplied to a circular die in the case of preparing a cylindrical laminate or T-die type in the case of preparing a flat laminate, and the thus assembled, coextruded resins are laminated. Or else, each resin is processed into each layer by extruding each resin in each extruder and each die, and a number of such layers are laminated together thereafter by, for instance, using heated rolls.

The thus prepared laminate according to the present invention is suitable for high-temperature-retort-packaging of foodstuffs. Namely, after processing the thinner laminate film into pouches, the fat-containing foodstuff is packed into the pouch and the thus pouched foodstuff is treated in the retort, or after processing the thicker laminate by deep-drawing into vessels, the foodstuff is introduced into the vessel and the thus can-type packed foodstuff is treated in the retort.

In addition, the laminate is subjected to blow-molding to be bottles for hot-filling or retort-treating.

Because of the favorable heat-sealing property of the laminates of the present invention as well as the excellent heat-resistance, oil-resistance and mechanical properties thereof, the laminate according to the present invention is capable of being subjected to heat-sealing, and because of the excellent compatibility between the modified polyolefin and the copolymer or the modified copolymer of ethylene and an acrylic ester, the transparency of the laminate is excellent. In the case where the polyamide is used for the first layer or the seventh layer, the gas-barrier effect thereof is added to that of the layer of copolymer of vinylidene chloride to make the laminate excellent in gas-barrier property.

In addition, the disposition of the layer of polyolefin as the seventh layer or the first layer which becomes the innermost layer when the laminate is film or sheet, is heat-sealed gives a further merit of excellent in heat-sealability.

Furthermore, in the case where the layer-construction of the laminate is symmetric concerning the central layer, there is a merit of no occurrence of curling of the heat-sealed laminate film when it is thermally treated.

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

EXAMPLES 1 TO 6 AND COMPARATIVE EXAMPLES 1 TO 5

Each of the resins for preparing each layer of the laminate of the present invention shown in Table 1 was extruded by using each of four or five extruders, and each of the thus respectively extruded resins was supplied in a molten and thermoplastic state to a common T-die, and the thus assembled molten resins were co-extruded through the T-die to be a laminate of the desired construction. The thickness of the first layer, the second layer, the third layer, the fourth layer, the fifth layer, sixth layer and the seventh layer was 300, 20, 30, 50 30, 20 and 300 micrometers, respectively, the total thickness being 750 micrometers.

The laminate thus prepared was subjected to the interlayer adhesion test as follows: (1) Immersion in lard oil at 95° C. for 120 min:

The specimens prepared by cutting the laminate into pieces of 10 cm square were immersed into lard oil at 95° C. for 12 min and then the interlayer adhesion was measured on the thus treated specimens.

(2) Treatment in a retort at 120° C. for 30 min:

The specimens prepared by cutting the laminate into pieces of 10 cm square were treated in pressured water at 120° C. for 30 min in a retort, and after cooling to room temperature, the interlayer adhesion was measured at room temperature.

The measurement of the interlayer adhesion was carried out following the indication of Japanese Industrial Standards (JIS) Z-1521, and the thus obtained interlayer adhesion is expressed by the following indices:

| Index | Interlayer adhesion (g/cm) |
|---|---|
| Excellent | larger than 300 |
| Fair | below 300 and larger than 200 |
| Moderate | below 200 and larger than 100 |
| Poor | below 100 and larger than 30 |
| Very poor | below 30 |
| Delami | delamination occurred on heat-treatment |

TABLE 1

| | First layer | Second layer | Third layer | Fourth layer | Fifth layer | Sixth layer | Seventh layer | Interlayer adhesion after immersion in lard oil at 95° C. for 120 min. | Interlayer adhesion after immersion in pressured water at 120° C. for 30 min. in retort |
|---|---|---|---|---|---|---|---|---|---|
| Example | | | | | | | | | |
| 1 | CM-6041[1] | P-300M[2] | $\frac{A-1600}{P-300M} = 9/1$[3] | PVDC[4] | $\frac{A-1600}{P-300M} = 9/1$ | P-300M | 5300B[5] | Fair | Fair |
| 2 | CM-6041 | P-300M | $\frac{A-1600}{P-300M} = 8/2$ | PVDC | $\frac{A-1600}{P-300M} = 8/2$ | P-300M | UZ-3010F[6] | Fair | Fair |
| 3 | CM-6041 | $\frac{A-1600}{P-300M} = 1/9$ | $\frac{A-1600}{P-300M} = 8/2$ | PVDC | $\frac{A-1600}{P-300M} = 8/2$ | $\frac{A-1600}{P-300M} = 1/9$ | S-131[7] | Excellent | Excellent |
| 4 | CM-6041 | $\frac{EEA[8]}{P-300M} = 1/9$ | $\frac{EEA}{P-300M} = 8/2$ | PVDC | $\frac{EEA}{P-300M} = 1/9$ | $\frac{EEA}{P-300M} = 1/9$ | S-131 | Fair | Fair |
| 5 | CM-1041[9] | $\frac{A-1600}{P-300M} = 1/9$ | $\frac{A-1600}{P-300m} = 8/2$ | PVDC | $\frac{A-1600}{P-300M} = 8/2$ | $\frac{A-1600}{P-300M} = 1/9$ | S-131 | Excellent | Excellent |
| 6 | CM-1041 | $\frac{A-1600}{P-300M} = 1/9$ | $\frac{A-1600}{P-300M} = 8/2$ | PVDC | $\frac{A-1600}{P-300M} = 8/2$ | $\frac{A-1600}{P-300M} = 1/9$ | CM-1041 | Excellent | Excellent |
| Comparative Example | | | | | | | | | |
| 1 | CM-6041 | P-300M | P-300M | PVDC | P-300M | P-300M | 5300B | Very poor | Very poor |

TABLE 1-continued

| | First layer | Second layer | Third layer | Fourth layer | Fifth layer | Sixth layer | Seventh layer | Interlayer adhesion after immersion in lard oil at 95° C. for 120 min. | Interlayer adhesion after immersion in pressured water at 120° C. for 30 min. in retort |
|---|---|---|---|---|---|---|---|---|---|
| 2 | CM-6041 | P-300M | EEA | PVDC | EEA | P-300M | S-131 | Delami. | Delami. |
| 3 | CM-6041 | P-300M | $\frac{EEA}{P-300M} = 5/5$ | PVDC | $\frac{EEA}{P-300M} = 5/5$ | P-300M | V-540-1*10 | Delami. | Delami. |
| 4 | CM-6041 | $\frac{A-1600}{P-300M} = 1/9$ | $\frac{A-1600}{P-300M} = 4/5$ | PVDC | $\frac{A-1600}{P-300M} = 4/6$ | $\frac{A-1600}{P-300M} = 1/9$ | S-131 | Very poor | Poor |
| 5 | CM-6041 | EEA | EEA | PVDC | EEA | EEA | S-131 | Delami. | Delami. |

*1: Nylon 6-66 made by TORAY CO, LTD. under the code of CM-6041
*2: Modified polypropylene, MODIK ® P-300M made by MITSUBISHI Petrochem. Co., Ltd.
*3: Acid-modified copolymer of ethylene and ethylacrylate, N—POLYMER, under the code of A-1600 made by NIPPON Petrochem. Co., Ltd.
*4: Copolymer of vinylidene chloride and vinyl chloride, KREHARON ® KUREHA Chem. Ind. Co., Ltd.
*5: High density polyethylene (density of 0.95 and crystal melting point of 130° C.), HIZEX ® 5300B made by MITSUI Petrochem. Co., Ltd.
*6: LLDPE, ULTOZEX ® UZ-3010F made by MITSUI Petrochem. Co., Ltd.
*7: Copolymer of ethylene and propylene, SUMITOMO NOBLEN ® S-131 (crystal melting point of 132° C.) made by SUMITOMO Chem. Ind. Co., Ltd.
*8: Copolymer of ethylene and ethyl acrylate, DPPJ 6169 made by NIPPON UNIKA Co., Ltd.
*9: Nylon 6 made by TORAY Co., Ltd. under the code of CM-1041
*10: Copolymer of ethylene and vinyl acetate (crystal melting point of 93° C.) made by SUMITOMO Chem. Ind. Co., Ltd. under the code of V-540-1.

As seen in Table 1, every laminate prepared in Examples 1 to 6 according to the present invention is excellent in the interlayer adhesion (interlaminar strength) after subjecting to each treatment.

Whereas, the laminate in which only the acid-modified polypropylene or only copolymer of ethylene and ethyl acrylate was used for the adhesive layer (Comparative Examples 1 or 5) was poor in the interlayer adhesion.

In addition, even in the case where two kinds of adhesive layers were provided, the product having one adhesive layer of acid-modified polypropylene and one adhesive layer of copolymer of ethylene and ethyl acrylate was insufficient in interlayer adhesion (interlaminar strength) resulting in delamination by heat-treatment.

Also in the case where the ratio of acid-modified polypropylene to copolymer of ethylene and ethylacrylate or modified copolymer of ethylene and ethylacrylate was outside of the range according to the present invention, the interlayer adhesion was poor and such a laminate could not attain the object of the present invention.

EXAMPLE 7

In a similar manner to that in Examples 1 to 6, a laminate consisting of the first layer, the second layer, the third layer, the fourth layer, the fifth layer, the sixth layer and the seventh layer except for the following:
the first layer formed of CM-6041 of a thickness of 20 micrometers,
the fourth layer of a thickness of 8 micrometers, the second- and sixth layers formed of P-300M of a thickness of 2 micrometers,
the seventh layer formed of 5300 B of a thickness of 20 micrometers, and
the third- and fifth layers formed of a 8:2 mixture of A-1600 and P-300M of a thickness of 2 micrometers, and the total thickness of the laminate of 56 micrometers.

After packing 10 pieces of ham containing 16% by weight of fat in the laminate film with the above-mentioned construction, the packages were heat-sealed and treated by pressured water retort at 120° C. for 30 min. No defect could be found on the thus treated packaged goods.

EXAMPLES 8 to 12

In the similar manner to that in Examples 1 to 6, however, using four extruders, the laminate shown in Table 2 with the following layer-construction were prepared, and on each of the thus prepared laminate, the interlayer adhesion (interlaminar strength) was measured in the same procedures as those in Examples 1 to 6 after treating them by the respective two test conditions shown in Examples 1 to 6. The results are also shown in Table 2. As will be seen in Table 2, the laminate showed sufficiently practical interlayer adhesion after each of the treatments.

The layer construction, namely the thickness of each layer, was 350 micrometers in the first layer, 20 micrometers in the second layer, 20 micrometers in the third layer, 50 micrometers in the fourth layer, 20 micrometers in the fifth layer, 20 micrometers in the sixth layer and 350 micrometers in the seventh layer, the total thickness of the laminate being 830 micrometers.

COMPARATIVE EXAMPLES 7 TO 12

In the similar manner to that in Examples 8 to 12, laminate of the respective constructions shown also in Table 2 were prepared, and the interlayer adhesion of each of the laminate was measured after treating the specimens by the respective two test conditions shown in Examples 1 to 6. The results are also shown in Table 2.

Namely, Comparative Example 7 is the case where the resin for the second layer was the same as the resin for the sixth layer, and also the resin for the third layer was the same as the resin for the fifth layer. Comparative Examples 8 and 9 are the cases where the mixture of copolymer of ethylene and ethylacrylate with a larger content of the heat-resistant resin was used in the third layer and the fifth layer. The two laminates were poor in interlayer adhesion and suffered from delamination by a minute deformation, and accordingly, they had no commercial value. Comparative Example 10 is the case where an acid-modified copolymer of ethylene and vinyl acetate which is an adhesive resin of a low melting point was used singly in the third layer and fifth layer, and the laminate suffered from delamination by the retort-treatment at 120° C. for 30 min, and accordingly the interlayer adhesion could not be measured.

Comparative Examples 11 and 12 are the cases where only one adhesive layer formed of a mixture of copolymer of ethylene and ethylacrylate and an acid-modified polypropylene was used, and even when the mixing ratio of copolymer of ethylene and ethylacrylate to the acid-modified polypropylene was changed variously, the heat-resistant interlayer adhesion was insufficient for attaining the object of the present invention.

TABLE 2

| | First layer | Second layer | Third layer | Fourth layer | Fifth layer | Sixth layer | Seventh layer | Interlayer adhesion after immersion in lard oil at 95° C. for 120 min. | immersion in pressured water at 120° C. for 30 min. in retort |
|---|---|---|---|---|---|---|---|---|---|
| Example | | | | | | | | | |
| 8 | FA-6411*1 | P-300M*2 | $\frac{A\text{-}1600}{P\text{-}300M} = 9/1$*3 | PVDC*4 | $\frac{A\text{-}1600}{P\text{-}300M} = 9/1$ | P-300M | FA-6411 | Fair | Fair |
| 9 | FA-6411 | P-300M | $\frac{A\text{-}1600}{P\text{-}300M} = 8/2$ | PVDC | $\frac{A\text{-}1600}{P\text{-}300M} = 8/2$ | P-300M | FA-6411 | Fair | Fair |
| 10 | FA-6411 | P-300M | $\frac{A\text{-}1600}{P\text{-}300M} = 7/3$ | PVDC | $\frac{A\text{-}1600}{P\text{-}300M} = 7/3$ | P-300M | FA-6411 | Fair | Fair |
| 11 | FA-6411 | $\frac{A\text{-}1600}{P\text{-}300M} = 1/9$ | $\frac{A\text{-}1600}{P\text{-}300M} = 8/2$ | PVDC | $\frac{A\text{-}1600}{P\text{-}300M} = 8/2$ | P-300M | FA-6411 | Fair | Fair |
| 12 | FA-6411 | QF-500 | $\frac{EEA}{QF\text{-}500} = 8/2$*5*6 | PVDC | $\frac{EEA}{QF\text{-}500} = 8/2$ | QF-500 | FA-6411 | Fair | Fair |
| Comparative Example | | | | | | | | | |
| 7 | FA-6411 | P-300M | P-300M | PVDC | P-300M | P-300M | FA-6411 | Very poor | Very poor |
| 8 | FA-6411 | P-300M | $\frac{EEA}{P\text{-}300M} = 6/4$ | PVDC | $\frac{EEA}{P\text{-}300M} = 6/4$ | P-300M | FA-6411 | poor | Very poor |
| 9 | FA-6411 | QF-500 | $\frac{A\text{-}1600}{QF\text{-}500} = 2/8$ | PVDC | $\frac{A\text{-}1600}{QF\text{-}500} = 2/8$ | QF-500 | FA-6411 | Very poor | Very poor |
| 10 | FA-6411 | P-300M | E-100H*7 | PVDC | E-100H | P-300M | FA-6411 | Very poor | Delami. |
| 11 | FA-6411 | | EEA/QF-500 = 8/2 | PVDC | EEA/QF-500 = 8/2 | | FA-6411 | poor | Very poor |
| 12 | FA-6411 | | EEA/QF-500 = 2/8 | PVDC | EEA/QF-500 = 2/8 | | FA-6411 | Very poor | Very poor |

*1: Copolymer of ethylene and propylene: SUMITOMO NOBLEN ® FA-6411 made by SUMITOMO Chem. Ind. Co., Ltd.
*2: Acid-modified polypropylene: MODIK ® P-300M made by MITSUBISHI Petrochem. Co., Ltd.
*3: Copolymer of ethylene and ethyl acrylate: EEA, DPDJ-6169 made by NIPPON UNIKA
*4: Copolymer of vinylidene chloride and vinyl chloride: KREHALON made by KUREHA Chem. Ind. Co., Ltd.
*5: Acid modified polypropylene: ADMER ®-QF-500 made by MITSUI Petrochem. Co., Ltd.
*6: Acid modified copolymer of ethylene and ethyl acrylate: N—POLYMER A-1600 made by NIPPON PETROCHEMICALS Co., Ltd.
*7: Acid modified copolymer of ethylene and vinyl acetate: MODIK E-100H made by MITSUBISHI Petrochem. Co., Ltd.

EXAMPLE 13

In the similar manner to that in Examples 8 to 12, a seven-layered laminate film was prepared with the following layer construction: the first layer and the seventh layer were formed of FA-6411* of a thickness of 30 micrometers; the second layer and the sixth layer were formed of P-300M of a thickness of 2 micrometers; the third layer and the fifth layer were formed of a 9:1 mixture of A-1600* and P-300M* of a thickness of 2 micrometers and the fourth layer formed of the copolymer of vinylidene chloride and vinyl chloride of a thickness of 12 micrometers, the total thickness of the laminate film being 80 micrometers.
Note * refer to Table 1.

By using the thus prepared laminate film, twenty pieces of hamburger sausage containing 16% by weight of fat were vacuum-packaged, and the thus packaged foodstuff were sterilized in a pressurized water-retort at 120° C. for 30 min. The thus treated product showed a favorable appearance without any defect and practically problematic curls.

What is claimed as new and desired to be secured by Letters Patent of the United States is:

1. A heat-resistant laminate comprising a first layer of a polymer of propylene or a polyamide; a seventh layer of a polyolefin or a polyamide; a fourth layer of a polymer of vinylidene chloride; a second layer and a sixth layer of an acid modified polyolefin or a mixture of not less than 90% of the acid modified polyolefin and not more than 10% by weight of a copolymer of ethylene and an acrylic ester or an acid modified copolymer of ethylene and an acrylic ester, the second layer and sixth layer being respectively directly jointed to the first layer and the seventh layer; a third layer and a fifth layer of a mixture of 10 to 30% by weight of an acid modified polyolefin and 90 to 70% by weight of a copolymer of ethylene and an acrylic ester or an acid modified copolymer of ethylene and an acrylic ester, the third layer and fifth layer being respectively disposed between the second layer and the fourth layer, and between the fourth layer and the sixth layer.

2. The heat-resistant laminate according to claim 1, wherein said polymer of propylene is a polypropylene or a copolymer of propylene and ethylene containing not less than 90% by weight of propylene units.

3. The heat-resistant laminate according to claim 2, wherein the crystal melting point of said polymer of propylene is in a range of 135° to 165° C.

4. The heat-resistant laminate according to claim 1, wherein said polyolefin of the seventh layer is selected from the group consisting of polypropylene, copolymers of propylene and ethylene containing not less than 90% by weight of propylene units, poly(4-methylpentene), polybutene, high density polyethylene, medium density polyethylene, linear low density polyethylene, a mixture of any one thereof and a mixture containing not less than 50% by weight of at least one of said polyolefins.

5. The heat-resistant laminate according to claim 4, wherein the crystal melting point of said polyolefin of the seventh layer is not less than 118° C.

6. The heat-resistant laminate according to claim 1, wherein said polyamide is selected from the group consisting of nylon 6, nylon 66, nylon 6-66, nylon 610, nylon 12, nylon 6-66-610, nylon 6-66-610-12.

7. The heat-resistant laminate according to claim 1, wherein said polymer of vinylidene chloride is a copolymer of 65 to 95% by weight of vinylidene chloride and 35 to 5% by weight of at least one comonomer which has at least one carbon-carbon unsaturated bond and is copolymerizable with vinylidene chloride.

8. The heat resistant laminate according to claim 1, wherein said acid modified polyolefin of the second, third, fifth and sixth layers is prepared by modifying a polyolefin as a base resin with an unsaturated carboxylic acid, or a metal salt thereof.

9. The heat-resistant laminate according to claim 8, wherein said polyolefin is a polypropylene.

10. The heat-resistant laminate according to claim 3, wherein said unsaturated caboxylic acid is acrylic acid, metacrylic acid, maleic acid or maleic anhydride.

11. The heat-resistant laminate according to claim 8, wherein the content of said unsaturated carboxylic acid therein is not more than 10% by weight of said acid-modified polyolefin.

12. The heat-resistant laminate according to claim 1, wherein said acid modified copolymer of ethylene and an acrylic ester is prepared by modifying a copolymer of ethylene and an acrylic ester as a base with an unsaturated carboxylic acid, or a salt thereof.

13. The heat-resistant laminate according to claim 12, wherein said acrylic ester is a $C_1$ to $C_8$-alkyl acrylate.

14. The heat-resistant laminate according to claim 12, wherein the content of said acrylic ester units in said copolymer of ethylene and an acrylic ester is in a range of 5 to 25% by weight.

15. The heat-resistant laminate according to claim 12, wherein said unsaturated carboxylic acid is acrylic acid, metacrylic acid, maleic acid or maleic anhydride.

16. The heat-resistant laminate according to claim 12, wherein the content of said unsaturated carboxylic acid therein is not less than 10% by weight of said acid modified copolymer of ethylene and an acrylic ester.

17. The heat-resistant laminate according to claim 1, wherein the total thickness of said heat-resistant laminate is 40 to 1000 micrometers.

18. The heat-resistant laminate according to claim 1, wherein said first layer is made of a resin selected from the group consisting of copolymers of propylene and ethylene, nylon 6-66 and nylon 6 and said seventh layer is made of a resin selected from the group consisting of copolymers of propylene and ethylene, high density polyethylene, linear low density polyethylene and nylon 6.

19. A heat-resistant laminate the total thickness of which is between 40 and 1000 micrometers, comprising a first layer of a polymer of propylene or a polyamide; a seventh layer of a polyolefin or a polyamide; a fourth layer of a polymer of vinylidene chloride; a second layer and a sixth a layer of an acid modified polyolefin or a mixture of not less than 90% of the acid modified polyolefin and not more than 10% by weight of a copolymer of ethylene and an acrylic ester or an acid modified copolymer of ethylene and an acrylic ester, the second layer and sixth layer being respectively directly jointed to the first layer and the seventh layer; a third layer and a fifth layer of a mixture of 10 to 30% by weight of an acid modified polyolefin and 90 to 70% by weight of a copolymer of ethylene and an acrylic ester or an acid modified copolymer of ethylene and an acrylic ester, the third layer and fifth layer being respectively disposed between the second layer and the fourth layer, and between the fourth layer and the sixth layer; wherein the sum of the thickness of:
(i) the first and seventh layers is between 25.2 and 950 micrometers;
(ii) the second and sixth layers is between 0.2 and 60 micrometers;
(iii) the third and fifth layers is between 0.2 and 60 micrometers; and wherein the thickness of the fourth layer is between 1.6 and 250 micrometers.

20. The heat-resistant laminate according to claim 19, wherein the thickness of:
(i) the first layer is greater than 10 micrometers;
(ii) the second layer is greater than 0.1 micrometers; and
(iii) the third layer is greater than 0.1 micrometers.

21. The process for preparing a heat-resistant laminate, comprising the steps of:
providing a polymer of propylene or a polyamide as a first layer; a polyolefin or a polyamide as a seventh layer; a polymer of vinylidene chloride as a fourth layer; an acid modified polyolefin or a mixture of not less than 90% by weight of an acid modified polyolefin and not more than 10% by weight of a copolymer of ethylene and an acrylic ester or an acid modified copolymer of ethylene and an acrylic ester as second and sixth layers and a mixture of 10 to 30% by weight of an acid modified polyolefin and 90 to 70% by weight of a copolymer of ethylene and an acrylic ester or an acid modified copolymer of ethylene and an acrylic ester as third and fifth layers in a plasticized condition within a die, co-extruding these resins in the configuration wherein the first layer is one of the outer layers; the seventh layer is the other outer layer; the fourth layer is the gas-barrier layer; the second and sixth layers are respectively directly jointed to the respective first and seventh layers and the third and fifth layers are respectively disposed between the fourth layer and the second layer and between the fourth layer and the sixth layer, and cooling the thus coextruded material, thereby obtaining said heat-resistant laminate.

22. The process according to claim 21, wherein said polymer of propylene is a copolymer of ethylene and propylene containing not less than 90% by weight of propylene units.

23. The process according to claim 22, wherein the crystal melting point of said polymer of propylene and propylene is in a range of 135° to 165° C.

24. The process according to claim 21, wherein said polyolefin of the seventh layer is selected from the group consisting of polypropylene, a copolymer of ethylene and propylene containing not less than 90% by weight of propylene units, poly(4-methylpentene), polybutene, high density polyethylene, medium density polyethylene, linear low density polyethylene, a mixture of any one thereof and a mixture containing not less than 50% by weight of at least one of said polyolefins.

25. The process according to claim 24, wherein the crystal melting point of said polyolefin is higher than 118° C.

26. The process according to claim 21, wherein said polyamide is selected from the group consisting of nylon 6, nylon 66, nylon 6-66, nylon 610, nylon 12, nylon 6-66-610 and nylon 6-66-610-12.

27. The process according to claim 21, wherein said polymer of vinylidene chloride is a copolymer of 65 to 95% by weight of vinylidene chloride units and 35 to 5% by weight of comonomer units of at least one of unsaturated comonomer.

28. The process according to claim 21, wherein said acid-modified polyolefin of the second, third, fifth and sixth layers is prepared by modifying a polyolefin with an unsaturated carboxylic acid or a metal salt thereof.

29. The process according to claim 28, wherein said polyolefin is polypropylene.

30. The process according to claim 28, wherein said unsaturated carboxylic acid is acrylic acid, metacrylic acid, maleic acid or maleic anhydride.

31. The process according to claim 28, wherein the content of said unsaturated carboxylic acid in said acid-modified polyolefin is not more than 10% by weight.

32. The process according to claim 21, wherein said acid modified copolymer of ethylene and an acrylic ester of the second, third, fifth and sixth layers is prepared by modifying a copolymer of ethylene and acrylic ester with an unsaturated carboxylic acid, or a metal salt thereof.

33. The process according to claim 32, wherein said acrylic ester is a $C_1$-$C_8$-alkyl acrylate.

34. The process according to claim 32, wherein the content of units of said acrylic ester in said acid modified copolymer of ethylene and acrylic ester is 5 to 25% by weight.

35. The process according to claim 32, wherein said unsaturated carboxylic acid is acrylic acid, metacrylic acid, maleic acid or maleic anhydride.

36. The process according to claim 32, wherein the content of said unsaturated carboxylic acid in said acid modified copolymer of ethylene and an acrylic ester is not more than 10% by weight.

37. The process according to claim 21, wherein the thickness of said heat-resistant laminate is 40 to 1000 micrometers.

38. The process according to claim 21, wherein said first layer is formed from a member selected from the group consisting of a copolymer of ethylene and propylene, nylon 6 and nylon 6-66, and said seventh layer is formed from a member selected from the group consisting of a copolymer of ethylene and propylene, high density polyethylene, linear low density polyethylene and nylon 6.

39. A process for preparing a heat-resistant laminate, the total thickness of which is between 40 and 1000 micrometers, comprising the steps of:

providing a polymer of propylene or a polyamide as a first layer; a polyolefin or a polyamide as a seventh layer; a polymer of vinylidene chloride as a fourth layer; an acid modified polyolefin or a mixture of not less than 90% by weight of an acid modified polyolefin and not more than 10% by weight of a copolymer of ethylene and an acrylic ester or an acid modified copolymer of ethylene and an acrylic ester as second and sixth layers and a mixture of 10 to 30% by weight of an acid modified polyolefin and 90 to 70% by weight of a copolymer of ethylene and an acrylic ester or an acid modified copolymer of ethylene and an acrylic ester as third and fifth layers in a plasticized condition within a die, co-extruding these resins in the configuration wherein the first layer is one of the outer layers; the seventh layer is the other outer layer; the fourth layer is the gas-barrier layer; the second and sixth layers are respectively directly jointed to the respective first and seventh layers and the third and fifth layers are respectively disposed between the fourth layer and the second layer and between the fourth layer and the sixth layer, and cooling the thus coextruded material, thereby obtaining said heat-resistant laminate, wherein the sum of the thickness of said laminate of:
 (i) the first and seventh layers is between 25.2 and 950 micrometers;
 (ii) the second and sixth layers is between 0.2 and 60 micrometers;
 (iii) the third and fifth layers is between 0.2 and 60 micrometers; and
wherein the thickness of the fourth layer of said laminate is between 1.6 and 250 micrometers.

40. The process according to claim 39, wherein the thickness of said heat-resistant laminate of:
 (i) the first layer is greater than 10 micrometers;
 (ii) the second layer is greater than 0.1 micrometers; and
 (iii) the third layer is greater than 0.1 micrometers.

* * * * *